Nov. 14, 1933.  C. RORABECK  1,934,820
TRACTOR LINK
Filed June 26, 1931  2 Sheets-Sheet 1
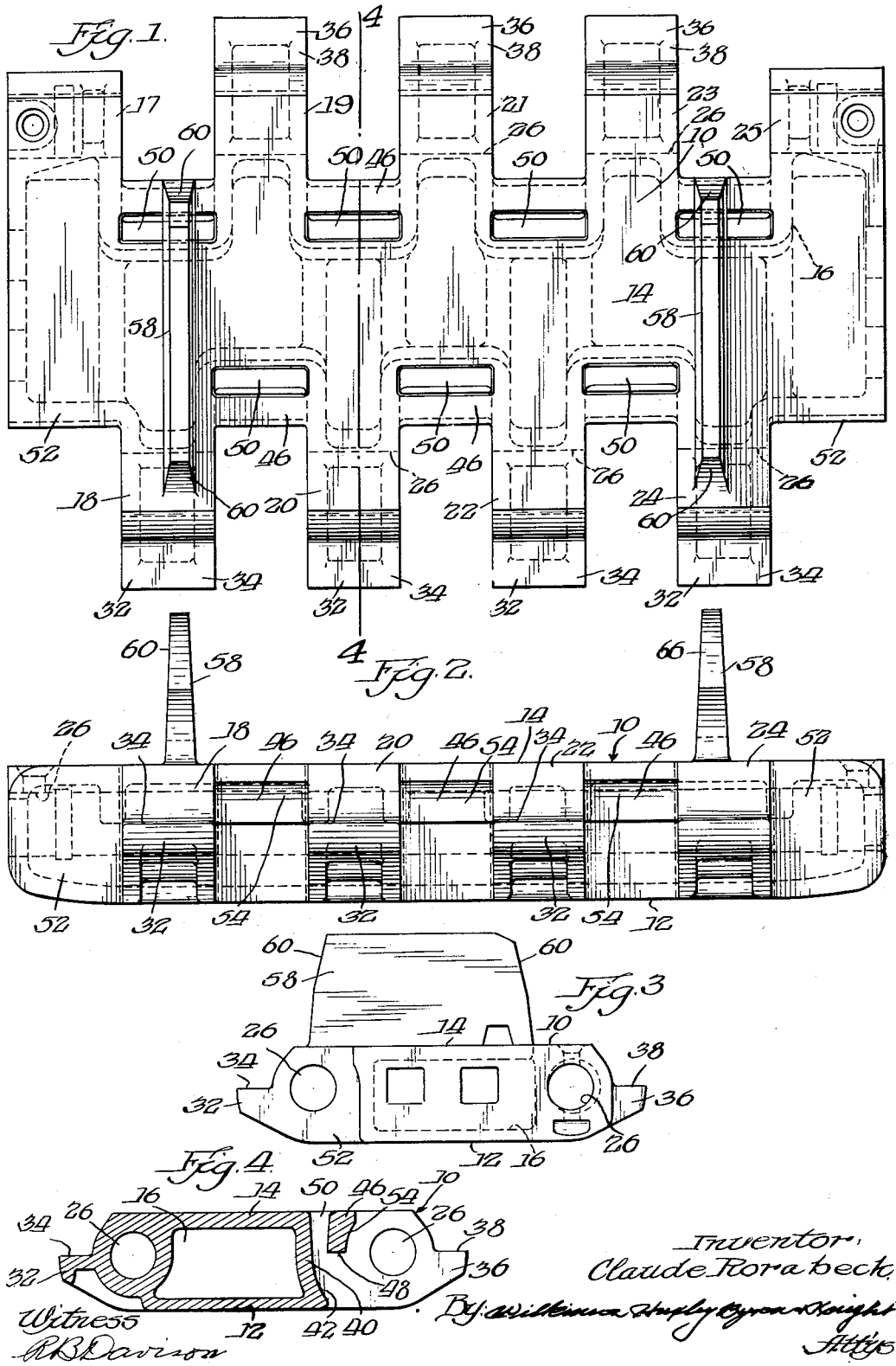

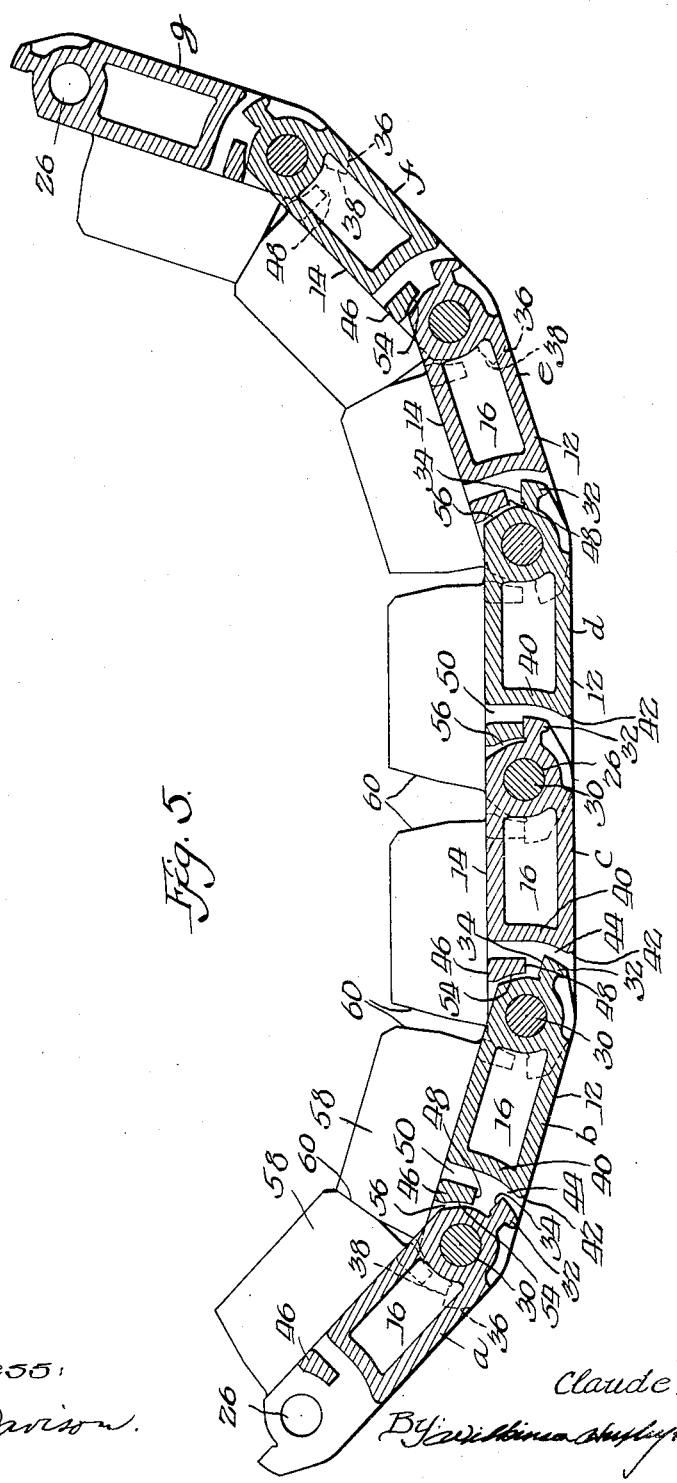

Patented Nov. 14, 1933

1,934,820

UNITED STATES PATENT OFFICE 1,934,820

TRACTOR LINK

Claude Rorabeck, Chicago Heights, Ill.

Application June 26, 1931. Serial No. 546,941

3 Claims. (Cl. 305—10)

This invention relates to improvements in tractor links of the type composed of integral castings having alternately disposed and oppositely extending pivot ears adapted to receive link pins forming a pivotal connection between adjacent links.

Various designs have been resorted to in order to provide limiting means for the folding movement of individual links with respect to each other. Thus when the chain is resting upon the ground it is desired to maintain the links in bearing engagement upon the ground between the wheels which rest upon the links and carry the load. It is also desirable to maintain the straight horizontal travel of the links at the upper part of the endless chain as they pass between the wheels. This may be accomplished by some means for limiting the folding movement of one link in one direction beyond the plane of an adjacent link. It is also desirable to limit the folding movement of the links in the opposite direction to a predetermined amount.

It is a feature of the present invention that the links are so formed that they overlap and come into abutting relationship to limit folding at a plane passing through the link pins.

It is an object of the invention to construct the links in such a manner that the pivot ears are formed with abutments to limit the folding movement of the links.

It is further an object of the invention to form the links with relief openings adjacent portions of the link which come into abutting relation with pivot ears of adjacent links, which relief openings permit the escape of dirt and prevent clogging of the connections.

It is further an object of the invention to form the drive flanges upwardly extending from the links in such a manner that they come into abutting relation to limit the folding movement in a direction opposite to the movement limited by the pivot ears.

Further objects and advantages of the present improvements will be more readily apparent from the following description taken in connection with the attached drawings, in which Figure 1 is an inner plane view of a tractor link;

Figure 2 is an end elevation of the tractor link shown in Figure 1;

Figure 3 is a side elevation of the tractor link shown in Figure 1;

Figure 4 is a vertical section taken on the plane indicated 4—4 in Figure 1, and Figure 5 is a section taken through a plurality of connected tractor links.

The link 10 is an integral casting substantially box-shaped in formation having a ground-engaging wall 12, a top wall 14 and end walls 15, while the interior of the link is cored as at 16 to form a central cavity. The sides of the link are provided with suitable walls to prevent entrance of dirt into the central cavity as will be later described. From one side of the tractor link extend pivot ears 18, 20, 22 and 24, while from the other side of the tractor link extend alternately disposed pivot ears 17, 19, 21, 23 and 25. Thus the pivot ears 18, 20, 22 and 24 will fit between the spaces of the pivot ears 17, 19, 21, 23 and 25 of an adjacent link and the pivot ears at each end have aligned openings 26 which are adapted to receive link pins 30, as in Figure 5. The pivot ears 18, 20, 22 and 24 have abutment projections 32 which, as shown in Figures 3 and 4, have flat stop faces 34 in a plane passing through the axes of the pin-receiving openings 26. The pivot ears 19, 21 and 23 have similar projecting abutments 36 having flat abutment faces 38 in the same plane with the abutment faces 34.

Intermediate each pair of pivot ears the cored opening 16 within the tractor link is closed at each side by a substantially vertical wall 40 curved at its lower end, as indicated at 42, whereby a clearance space 44 remains as shown in Figure 5 when connected with an adjacent link. Extending substantially parallel to the side wall 40 between each pair of pivot ears is a cross bar 46, terminating at its lower portion to form a stop face 48 in the same plane as the stop faces 34 and 38. The space between the cross bar 46 and the closing side wall 40 provides an upwardly directed relief opening 50 and, as shown in the plan view of Figure 1, there are a plurality of such relief openings 50 on one side of the link between the pivot ears 18, 20, 22 and 24, while at the opposite side of the link similar relief openings 50 appear between each pair of pivot ears. The cross bars 46 in the lower portion of Figure 1 are shown to be substantially in line with side walls 52 which have no abutments to cooperate with the outside pivot ears 17 and 25. The cross bars 46 are curved as at 54 to leave a small clearance indicated 56 in Figure 5. As shown in Figure 5, the relief openings 50 permit the escape of dirt which might otherwise become wedged between the cooperating abutment faces.

In Figure 5 there are shown a plurality of connected tractor links indicated $a$, $b$, $c$, $d$, $e$, $f$ and $g$. The links $a$ and $g$ are folded to their greatest extent out of a common plane and the separation between the abutment faces 34 and 36 is a maximum. It will be apparent that the clearance opening 44 is substantially the same in size at any relative position of the links. The links *a* and *b* in the positions shown are in stop positions by the engagement of drive flanges 58 which extend upward from the top wall 14 of the link and which are formed with angular stop faces 60. The links *b* and *c* are shown to be in intermediate position between the limits provided by the abutments. The links *c* and *d* have reached a common plane and at this stage the abutment faces 34 and 36 of the adjacent links are in engagement on opposite sides of the link pin 30 which forms a connection between the adjacent links and it will be noticed that the interlocking engagement is substantially within the body of the links.

It is believed to be evident that the design of tractor link disclosed is a very practical and satisfactory construction to accomplish the desired results. However, many changes and modifications may be resorted to in the specific embodiment without departing from the spirit of the invention as expressed in the appended claims.

I claim:

1. A tractor link comprising a ground-engaging bottom wall, a load-receiving top wall, closing side walls and pivot ears alternately and oppositely extending from said closing side walls, the pivot ears on each side of the link having coaxially disposed pintle receiving openings, abutments formed integral with certain of said pivot ears and abutments extending between pairs of pivot ears on one side of the link spaced from the closing side walls to leave relief openings for the exit of dirt.

2. A tractor link comprising an integral casting having a bottom wall, a top wall, side walls and end walls to form a box-like link body having a central cavity, a plurality of pivot ears alternately projecting from opposite side walls of the link, the pivot ears on one side forming spaces therebetween to receive the pivot ears of an adjacent connected link, at least one of the pivot ears on each side of the link including a projection having an abutment face parallel to the top wall of the link and facing upwards, the body of the link having between at least one pair of pivot ears on each side of the link a recess formed to receive the abutment projection on a pivot ear of an adjacent connected link, the top wall of said recess forming an abutment face parallel to the top wall of the link and facing downwards to contact with the abutment face of an adjacent connected link, the cavity of the link being closed adjacent the recess to prevent extrusion of dirt thereinto and the body of the link having a relief opening extending upwardly from the inner end of each of said recesses to permit extrusion of dirt through the top wall of the link from between the abutment faces of cooperating links.

3. A tractor link comprising an integral casting having a bottom wall, a top wall, side walls and end walls to form a box-like link body having a central cavity, a plurality of pivot ears alternately projecting from opposite side walls of the link, there being one more pivot ear on one side of the link than on the other side and the pivot ears on each side of the link being spaced to receive therebetween the pivot ears of an adjacent connected link, all the pivot ears on the side of the link having the lesser number of pivot ears and the pivot ears on the other side of the link between the end pivot ears including outwardly directed projections having abutment faces radial to the axis of the pivot ears, parallel to the top wall of the link and facing upward, the body of the link having between each pair of pivot ears on each side of the link recesses formed to receive the abutment projections on adjacent connected links, the top walls of said recesses forming abutment faces radial to the axis of the pivot ears, parallel to the top wall of the link and facing downwards to contact with the abutment faces of adjacent connected links, the cavity of the link being closed by the side walls thereof adjacent each set of recesses and the body of the link having relief openings extending upwardly from the inner end of each of the recesses to permit extrusion of dirt through the top wall of the link from between abutment faces of adjacent connected links.

CLAUDE RORABECK.